Patented Sept. 8, 1942

2,295,030

UNITED STATES PATENT OFFICE 2,295,030

PROCESS FOR GELLING AN AQUEOUS DISPERSION OF NEOPRENE

Benton Dales, Bowling Green, Pa., assignor to E. I. du Pont de Nemours & Company, Wilmington, Del., a corporation of Delaware No Drawing. Application August 3, 1940, Serial No. 351,229

8 Claims. (Cl. 260—821)

This invention relates to the formation of articles from neoprene dispersions. More particularly, it relates to a process for the formation of articles of appreciable size cast in molds and articles of more than 0.025 inch thickness made on molds by the gelation of suitably compounded neoprene dispersion.

The making of articles by molding of rubber and rubber-like materials from aqueous dispersions is known. In general, this has been accomplished by the coagulation of the rubber or rubber-like material from rubber latex or from dispersions of the rubber-like material either in a mold or upon a mold. In the case of rubber, it is also known that rubber latex may be placed in a mold and set (or gelled) by the addition of suitable gelling agents. However, the agents which cause gelation of rubber latex have, in general, not been effective when tried upon dispersions of neoprene (polymerized chloro-2-butadiene-1,3).

It is an object of this invention to make molded articles of neoprene, and of compounded neoprene, from neoprene dispersions. Another object is to form molded articles of appreciable size from neoprene dispersions. Still another object is to form articles of unusual thickness by dipping molds into neoprene dispersions. Further objects will appear hereinafter.

The objects of this invention have been accomplished by the discovery that aqueous dispersions of neoprene wherein soluble abietates and soluble hydroabietates are the dispersing agents which dispersions have been stabilized with ammonia or its equivalent may be gelled by bringing them into contact with boric acid or one of the esters of boric acid. Thus, such an aqueous sodium abietate dispersion of neoprene may be placed in a mold and a small amount of a boric acid solution may be added thereto. No effect may be observed immediately, but in a short time the mass sets to a gel. The gel may be dried, whereupon it shrinks, but retains its molded form. Preferably the boric acid solution is added to the dispersion before pouring into the mold. Also, a mold or form may be dipped into a boric acid solution, or mixed suspension and solution, and then into the said neoprene dispersion. After the gel forms on the mold, it may be withdrawn and dried. In this way, dried articles may be made of greater thickness than by prior art coagulation methods. Moreover, the articles may be made of dispersions containing curing, filling, and compounding ingredients, and, after drying, may be cured to form articles having characteristics similar to cured rubber and additional known characteristics of neoprene products.

In order that the invention may be more fully understood, the following specific examples are given. Such examples are merely by way of illustration, and the invention is not limited thereto as will become more fully apparent hereinafter. Example A is an example of an aqueous sodium abietate dispersions of neoprene made by a prior art process which is suitable for use in the present invention.

Example A

One hundred parts of chloroprene substantially free from acetaldehyde, monovinylacetylene, divinylacetylene, methyl vinyl ketone, and dichloro-1,3-butene-2 and to which 0.25 part of sulfur and 2 parts of cyclohexanol have been added is emulsified by gradual addition, with the rapid mechanical agitation secured by repeated passage through a centrifugal pump, to 100 parts of a solution in water of 4 per cent of sodium abietate, 0.25 per cent of sodium hydroxide and 0.25 per cent of ammonium persulfate. The dispersion is then maintained in a vessel which could be externally heated or cooled at a temperature of 40° C. until polymerization is substantially complete as shown by the rise in specific gravity of the dispersion (measured at 20° C.) to about 1.10. This ordinarily requires about 6 hours. Variations in the time required to complete the polymerization even when conditions are closely duplicated make it advisable to determine the end point by specific gravity measurements rather than by the lapse of a definite period of time.

When the polymerization is substantially complete, the latex is treated with 0.73 part of a 29 per cent aqueous ammonia solution and also with a liquid mixture of 0.55 part of phenyl alphanaphthylamine and 0.45 part of diphenylamine dispersed in 1 part of a 3 per cent aqueous solution of the sodium salt of an acid obtained by condensing naphthalene sulfonic acids with formaldehyde according to U. S. Patent No. 1,191,480. The latex is then ready for storage and use.

Example I

To 100 cc. of a neoprene dispersion made as in Example A, twenty (20) cc. of a 5 per cent solution of boric acid in water is added, with stirring and the mix poured into a mold, the mold being at room temperature. No immediate action occurs, but after 90 minutes, the entire mass sets to a gel occupying the same volume as the liquid and having the shape of the mold. The wet gel is uniform and tough enough so that it can be handled carefully without distortion. The fresh gel shrinks considerably, exuding a milky serum, but, in shrinking, it preserves its original shape. It is dried at room temperature.

Example II

A neoprene dispersion with sulphur, fillers, and compounding ingredients is prepared as follows, the figures representing parts by weight of dry material:

| | |
|---|---:|
| Neoprene (as a dispersion prepared according to Example A) | 100.0 |
| Lithopone | 10.0 |
| Zinc oxide | 5.0 |
| Sulfur | 2.0 |
| Phenyl-beta-naphthylamine | 2.0 |
| Sodium dibutyldithiocarbamate | 0.8 |

Into 242 grms. of the above compounded dispersion is poured 20 grms. of 5 per cent boric acid solution in water with stirring and the mix is poured into a mold. At the end of ten minutes, the liquid becomes a gel which shrinks in the same manner as that in Example I, but to a less degree. The gel is dried at room temperature and cured by heating for 30 to 40 minutes at about 140° C. The product so produced is the shape of the mold, but smaller than the mold. It exhibits the usual characteristics of cured compounded neoprene.

Example III

A form is dipped into a saturated solution of boric acid in water which is thickened with glue. The form is withdrawn, the excess material allowed to drain and the film adhering to the form allowed to dry. The form carrying this film is introduced into a neoprene dispersion made as in Example A. After immersion for 40 minutes the form is very slowly withdrawn (about one inch per minute) and the neoprene gel film is air dried at room temperature. A uniform film of uncured neoprene is obtained.

Example IV

A form is dipped into a saturated solution of boric acid in water, withdrawn, drained and allowed to dry thereby forming a film of boric acid thereupon. The form is then immersed in a compounded neoprene latex mix as described in Example II for 30 minutes. The form is then carefully withdrawn, but at somewhat greater speed than in Example III, and dipped in a coagulating bath of alcoholic solution of calcium chloride and withdrawn. This bath hardens the surface of the gel. The neoprene gel is allowed to dry at 22° to 25° C. and a uniform solid film is obtained of about 0.05 inch thickness. The film is cured by heating for 35 minutes at about 140° C.

Example V

A latex mix is made on the following recipe, the figures representing parts by weight of dry materials:

| | |
|---|---:|
| Neoprene (as sodium abietate latex) | 100.0 |
| Lithopone | 10.0 |
| Zinc oxide | 5.0 |
| Sulfur | 2.0 |
| Phenyl-beta-naphthylamine | 2.0 |
| Di-ortho-tolylguanidine | 1.0 |
| Egg albumen | 1.0 |
| Sodium dibutyldithiocarbamate | 0.8 |

Forty parts of boric acid are dissolved and suspended in 100 parts of methyl alcohol. The molds are dipped into this mixture and withdrawn, the alcohol film then is allowed to evaporate. The mold with the coating of boric acid is immersed in the above latex mix for 30 minutes, carefully withdrawn and subsequently immersed in an acetone solution of acetic acid to set the surface of the gelled deposit. The gelled film is dried on the form and cured as in Example II. This film is 0.090 inch thick.

The neoprene dispersions with which this invention is concerned are those aqueous dispersions of neoprene wherein sodium abietate, or its equivalent, is the dispersing agent. It has been found that sodium hydroabietate and other water-soluble abietates and hydroabietates may replace sodium abietate. The amount of the dispersing agent will depend upon other factors such as the concentration of the neoprene, etc. In general, there will be present from about 0.2 per cent to 6 per cent of the dispersing agent based on the weight of the water, although still lower or higher amounts may also be used. The concentration of neoprene in the dispersion is not critical. In general, 40 per cent to 65 per cent neoprene by weight may be used. The preferred concentrations are from about 45 per cent to 55 per cent neoprene.

In addition to having a specific type of dispersing agent as above described, the neoprene dispersions must be stabilized with ammonia or its equivalent. It has been found that methanol amines, ethanol amines and propanol amines may be used in place of ammonia, although the latter is preferred.

The neoprene should preferably be substantially free of monovinylacetylene, divinylacetylene, acetaldehyde, and dichloro-1,3-butene-2. In general, 0.5 per cent monovinylacetylene, 0.2 per cent acetaldehyde, and 0.5 per cent dichloro-1,3-butene-2 may be present without seriously affecting the quality of the latex. The process of the present invention is not dependent upon the presence or absence of higher percentages of impurities.

The method of making the dispersion is not part of the present invention. Thus, for example, restricting the method to the water-soluble abietates and hydroabietates, the modifications disclosed in copending application of Collins, Serial No. 204,305, filed April 26, 1938, may be used. It must be emphasized that the present invention is not based upon any particular way of making the neoprene dispersion or critical proportions of the ingredients thereof, although certain concentrations of ingredients are preferred, but the invention is limited to the type of aqueous dispersions of neoprene wherein water-soluble abietates and water-soluble hydroabietates are the dispersing agents. Sodium abietate is preferred.

The gelling agent with which this invention is concerned is boric acid, or its equivalents. Esters of boric acid, such, for example, as tri-amyl borate, tri-butyl-borate, tri-propyl borate and other tri-alkyl borates have an effect similar to boric acid, although the latter is preferred. The method of bringing the boric acid into contact with the neoprene dispersion is not confined to the examples. The boric acid may be used in aqueous solution or suspension where it is to be added to the neoprene dispersion. Preferably the boric acid is added to the neoprene dispersion before pouring into the mold since it is easier to distribute it uniformly through the dispersion in this manner. However, the boric acid may be added after the neoprene dispersion has been poured into the mold, especially where the mold is of a simple shape. Preferably a saturated (5%) aqueous solution of boric acid is used in the casting process. It has been found that as little as 1 per cent of boric acid based on the dry weight of the neoprene will produce gelation. In general, from 1 per cent to 10 per cent of boric acid based on the dry weight of neoprene is quite satisfactory, although the invention is not limited thereto.

The period required for gelation after addition of boric acid solution to these neoprene dispersions varies with other conditions such as concentrations of boric acid, temperature, etc. Thus, at room temperature, using uncompounded dispersions and 1 per cent boric acid based on the neoprene content, the time may be from 30–90 minutes. At lower temperature, the time may increase to 2 or 3 hours. Gelation is more rapid with temperatures above room temperature. As the temperature of the gelation step rises, the products tend to become porous instead of of uniform, non-permeable masses or films. In some cases, this may be desirable, and in such instances, elevated temperatures are preferred. Where non-porous products are desired, the temperature will be maintained not much above room temperature, i. e., in general 15° to 30° C. and not exceeding 30° to 40° C. Compounded dispersions gel more rapidly and may be completely gelled in a mold in from 5–15 minutes at room temperature.

When the products are made by dipping a mold or form, which may be permeable or impermeable, into a neoprene dispersion, it is possible that there is a tendency for coagulation to occur on the mold at the moment of immersion, but the boric acid rapidly dissolves in the adjacent dispersion and produces gelation. This results in a product which, when dried, is two to four times as thick as films produced by prior art coagulation processes. In this embodiment of the invention, the time required for gelation varies with temperature and with the amount of boric acid on the mold. Thus, the time of immersion of the mold at room temperature may be 30 minutes or more for uncompounded dispersions and 10 minutes or more for compounded dispersions.

In this embodiment, a film of boric acid or an ester thereof is formed on the mold or form before dipping into the neoprene dispersion. A convenient method for accomplishing this is to dip the mold or form into a saturated solution of boric acid in alcohol. Aqueous solution or suspension of boric acid may be used but alcoholic solutions are preferable because of quicker drying. The solution is preferably thickened with any of the usual film-forming, thickening agents known to the art, such for example, as glue, gelatin, casein, starches, alginates, methyl cellulose, etc. The mold is withdrawn, drained, dried, and then immersed into the neoprene dispersion.

Molds or forms having gelled deposits thereupon may be withdrawn from the dispersion slowly enough to give a good uniform film of gel upon the mold. A rate of about one inch per minute is satisfactory. It is easier, however, to withdraw the mold with its soft surfaced mixture of gel and fluid mix carefully, but with somewhat greater speed than above, and then carefully immerse the mold and gel in a coagulating bath, such, for example, as is described in Example IV. Other examples of coagulating baths are ethyl alcohol solutions of calcium salts, or solutions of acids in ethyl alcohol, acetone, etc. The time of this immersion is short. The gel is then dried. After drying, the product may be cured or vulcanized by any known procedure, such, for example, as that described in Example II.

Films having a thickness of from 0.025 to 0.1 inch may be made by the above-described process. The thickness of the films may be slightly increased and the inner surface may be made smoother by incorporating into the gelling agent insoluble materials such, for example, as clay, bentonite, calcium sulfate, plaster of Paris, etc., or film-forming agents such, for example, as shellac, rosin, etc. If desired, more than one dip into the neoprene dispersion may be made. In this case, the mold should be dipped into an alcoholic solution of boric acid between dips into the neoprene dispersion, and no dips into the coagulating baths herein earlier described should be made prior to the last dip into the neoprene dispersion.

Whether the gel is made in a mold or on a mold, it is preferably dried slowly and uniformly at or slightly above room temperature, i. e., at a temperature of 15° to 30° C. and not exceeding, in general, 30° to 40° C. The drying is preferably done in moist air.

It is also possible to make neoprene products without the use of a mold. Thus, the dispersion may be gelled, cut into strips or sheets, and dried. These dried sheets may be cured when made from suitably compounded dispersions as above described. Alternatively, the gel may be dried or even cured before cutting into the final shape.

This invention provides a new process for the making of neoprene articles. It provides a method of molding articles from neoprene dispersions by gelation. Large articles, thick films for sheeting, industrial gloves, heavy walled tubing, and many other products may be produced from neoprene dispersions with an ease never before attained.

It is apparent that many widely different embodiments of this invention may be made without departing from the spirit and scope thereof, and it is not intended to be limited except as indicated in the appended claims.

I claim:

1. Process which comprises causing an aqueous dispersion of neoprene, wherein the dispersing agent is a member of the group consisting of water-soluble abietates and hydroabietates and wherein the dispersion is stabilized with a member of the group consisting of ammonia, methanol amines, ethanol amines and propanol amines, to gel by bringing a member of the group consisting of boric acid and its esters into contact with the dispersion.

2. Process which comprises causing an aqueous dispersion of neoprene, wherein the dispersing agent is a member of the group consisting of water-soluble abietates and hydroabietates and wherein the dispersion is stabilized with a member of the group consisting of ammonia, methanol amines, ethanol amines and propanol amines, to gel by bringing boric acid into contact with the dispersion.

3. Process which comprises causing an aqueous dispersion of neoprene, wherein the dispersing agent is a member of the group consisting of water-soluble abietates and hydroabietates, and wherein the dispersion is stabilized with ammonia, to gel while in contact with a mold by bringing boric acid into contact with the dispersion.

4. Process which comprises causing an aqueous sodium abietate dispersion of neoprene stabilized with ammonia, to gel by bringing boric acid into contact with the dispersion.

5. Process which comprises causing an aqueous sodium abietate dispersion of neoprene stabilized with a member of the group consisting of ammonia, methanol amines, ethanol amines, and propanol amines having therein a neoprene concentration of from 40 to 65 per cent neoprene to gel by bringing into contact therewith boric acid in an amount of from 1 to 10 per cent based on the neoprene.

6. Process which comprises causing an aqueous sodium abietate dispersion of neoprene stabilized with ammonia having therein a neoprene concentration of from 45 to 55 per cent neoprene to gel by bringing into contact therewith boric acid in an amount of from 1 to 10 per cent based on the neoprene.

7. Process which comprises causing gelation of an aqueous sodium abietate dispersion of neoprene stabilized with a member of the group consisting of ammonia, methanol amines, ethanol amines, and propanol amines, having therein a neoprene concentration of from 40 to 65 per cent neoprene and a curing agent, fillers, and compounding ingredients by bringing such dispersions into contact with boric acid in an amount of from 1 to 10 per cent based on the neoprene.

8. Process which comprises causing gelation of an aqueous sodium abietate dispersion of neoprene, stabilized with ammonia, having therein a neoprene concentration of from 45 to 55 per cent neoprene and a curing agent, fillers, and compounding ingredients by bringing such dispersions into contact with boric acid in an amount of from 1 to 10 per cent based on the neoprene.

BENTON DALES.

CERTIFICATE OF CORRECTION.

Patent No. 2,295,030.  September 8, 1942.

BENTON DALES.

It is hereby certified that error appears in the printed specification of the above numbered patent requiring correction as follows: Page 2, first column, line 22, for "pillers" read --fillers--; and that the said Letters Patent should be read with this correction therein that the same may conform to the record of the case in the Patent Office.

Signed and sealed this 13th day of October, A. D. 1942.

(Seal)

Henry Van Arsdale,
Acting Commissioner of Patents.